Figure 1:
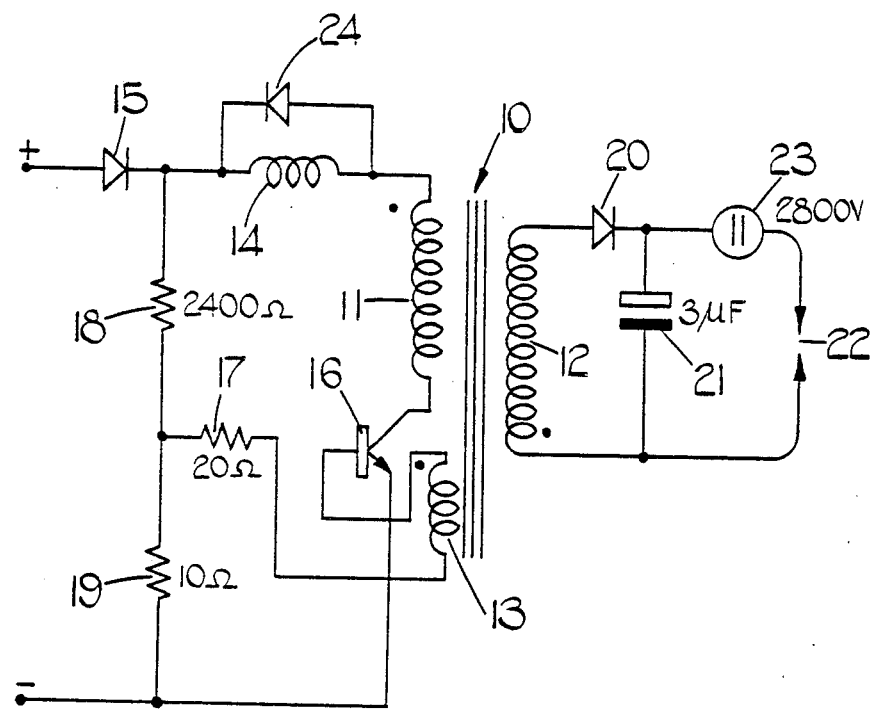

United States Patent [19]

Chafer et al.

[11] 4,261,025
[45] Apr. 7, 1981

[54] SPARK DISCHARGE IGNITION SYSTEMS FOR GAS TURBINE ENGINES

[75] Inventors: Henry J. Chafer, Hemel Hempstead; Anthony J. Purkiss, High Wycombe, both of England

[73] Assignee: Lucas Industries Limited, Birmingham, England

[21] Appl. No.: 82,052

[22] Filed: Oct. 5, 1979

Related U.S. Application Data

[63] Continuation-in-part of Ser. No. 744,754, Nov. 24, 1976, abandoned.

[30] Foreign Application Priority Data

Dec. 3, 1975 [GB] United Kingdom ............... 49593/75

[51] Int. Cl.³ .......................... F23Q 3/00; F02P 3/06
[52] U.S. Cl. .................................. 361/257; 123/598; 315/209 CD; 331/113 A
[58] Field of Search ............................ 361/256, 257; 331/113 A, 148; 363/16, 18; 315/209 CD, 209 M; 123/148 E, 148 CB

[56] References Cited

U.S. PATENT DOCUMENTS

| 2,894,210 | 7/1959 | Erb ........................... 331/113 A |
| 2,954,532 | 9/1960 | Pentecost et al. ............... 331/113 A |
| 3,114,115 | 12/1963 | Taunt ........................... 331/113 A |
| 3,247,422 | 4/1966 | Schultz ........................... 331/113 A |
| 3,889,160 | 6/1975 | Cobarg ............................. 361/256 |

Primary Examiner—C. C. Shaw
Attorney, Agent, or Firm—Kane, Dalsimer, Kane, Sullivan and Kurucz

[57] ABSTRACT

A spark ignition system utilizes a one transistor inverter including a transformer with a primary winding, controlled by the transistor and a feedback winding switching the transistor on and off. The core of the transformer saturates at a current less than that required to saturate the transistor. An inductor in series with the primary winding has an inductance greater than that of the primary winding when the latter is saturated but less than that of the primary winding when the latter is not saturated. The second winding is used to charge a capacitor which has a spark circuit across it.

4 Claims, 6 Drawing Figures

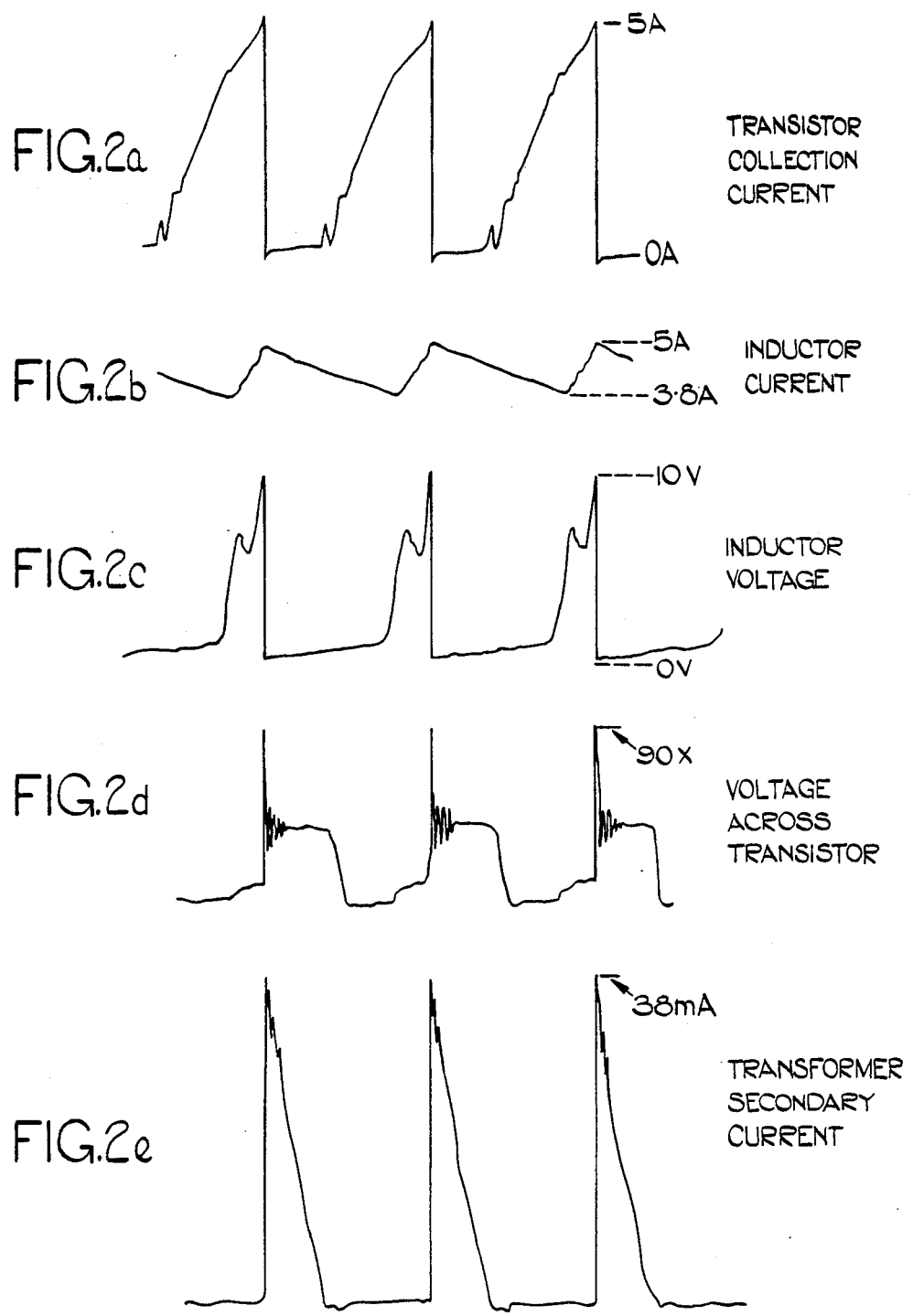

SPARK DISCHARGE IGNITION SYSTEMS FOR GAS TURBINE ENGINES

This application is a continuation-in-part of our U.S. patent application Ser. No. 744,754 filed Nov. 24, 1976, now abandoned.

This invention relates to spark discharge ignition systems for gas turbine engines incorporating d.c. to d.c. converters.

A simple known form of d.c. to d.c. converter uses a transistor controlling the current through the primary winding of a transformer which also has a secondary winding and a feedback winding connected to the base circuit of the transistor. Conventionally oscillation is brought about in such simple known converters by the transistor saturating at a certain primary current level. With such an arrangement the current level at which the transistor saturates depends on the gain of the transistor so that the output power is temperature dependent.

It has also been proposed to use a saturating transformer core so that transformer characteristics rather than the transistor characteristics determine the amount of output power produced. With such a simple arrangement, however, there is a danger of a high current transient occurring at the instant when the transformer core goes into saturation because of the drastically reduced impedance of the primary winding when the core is saturated. This spike not only endangers the transistor but can also cause a peak in the output waveform rendering the output power performance of the converter uncertain.

To overcome this spike effect it has previously been proposed to make use of a saturable inductor in the circuit arranged to be in saturation when the primary current was less than that required to saturate the transformer core, but to become unsaturated as the transformer coil becomes saturated. To enable this proposed circuit to operate it was necessary to provide both the transformer and the saturable inductor with a bias winding and two adjustable resistors were included in series with the respective bias windings to cause a fixed current to pass therethrough. The resistors required adjustment to ensure that at a given d.c. supply voltage the spike was completely removed without unnecessarily reducing the efficiency of the converter. Such an arrangement would, however, operate satisfactorily only at the supply voltage for which it was adjusted and if used in an installation where there was some fluctuation of the supply voltage, uncertain and inefficient conversion result.

The present invention has as one object to provide a spark discharge ignition system including a d.c. to d.c. converter the output power of which is relatively insensitive to fluctuations in temperature and supply voltage.

A spark ignition system in accordance with the invention comprises a d.c. to d.c. converter including a transformer having a primary winding, a secondary winding and a feedback winding, a core by which said windings are linked said core having an air gap and being arranged to saturate when the primary current exceeds a predetermined level, a transistor connected to control the current in the primary winding of the transformer, the feedback winding being connected to the base of the transistor to provide positive feedback thereto, an inductor connected in series with the primary winding of the transformer and having an inductance significantly greater than the inductance of the primary winding when the transformer core when the latter is saturated but significantly less than the inductance of the primary winding when the transformer core is not saturated, the inductor being designed so as to be unsaturable by said predetermined current level, a diode connected across the inductor so as to maintain current flow therein when the transistor is off and means connected to the secondary winding for periodically producing sparks.

With this arrangement, when the transformer core starts to saturate, in each cycle of operation of the converter, the inductor will prevent the primary current rising sharply, and will also cause the voltage across the primary winding to fall.

An example of the invention is shown in the accompanying drawings in which;

FIG. 1 is a circuit diagram of a spark ignition system incorporating a d.c. to d.c. converter and FIGS. 2a–2e show voltage and current waveforms at various points in the circuit.

The circuit shown in the drawing includes a transformer 10 having a primary winding 11, a secondary winding 12 and a feedback winding 13. One end of the primary winding 11 is connected via an inductor 14 to the cathode of a diode 15, the anode of which is connected to a positive supply terminal. The other end of the winding 11 is connected to the collector of an n-p-n transistor 16 the emitter of which is connected to a negative supply terminal. The base of the transistor 16 is connected via the winding 13 and a resistor 17 in series to the common point of a resistive potential divider 18, 19 connected between the cathode of the diode 15 and the negative supply terminal. The secondary winding 12 is connected by a diode 20 to a capacitor 21 on which the d.c. output appears. The cathode of diode 20 is also connected to a spark gap 22 via a spark discharge plug 23. The second terminal of the spark gap 22 is connected to the junction of capacitor 21 and secondary winding 12.

The transformer 10 has a laminated core (made up conventionally of E and I shaped laminar elements) of mumetal with a cross-sectional area of 0.1 square inches formed with an air gap nominally of 0.008 inches width. The windings 11, 12 and 13 have 64, 6100 and 25 turns respectively. The inductor 14 has a similar laminated core of silicon steel with a cross-sectional area of 0.08 square inches and an air gap of 0.006 inches width.

In operation the winding 13 provides regenerative feedback in known manner so that the primary current rises until the transistor 16 comes out of saturation whereupon the feedback ceases and the transistor is rapidly switched off. The core of the transformer is designed to saturate at a primary current less than that at which the transistor switches off. Ignoring the inductor 14 for the time being the effect of saturation of the core is to lower the primary inductance sharply with the result that the primary current rises very sharply before the transistor switches and turns off thus creating a spike in a primary current waveform. The inductor 14 which has an inductance which is small compared with the primary inductance when the core is unsaturated, but large compared with the primary inductance when the core is saturated, reduces this current spike. The inductor and the primary winding in fact act as an inductive voltage divider so that the voltage across the primary winding is sharply reduced as the transformer core goes into saturation and thus reduces the base drive to the transistor initiating the switching off process.

A diode 24 connected across the inductor 14 provides a low impedance path for the current in the inductor 14 when the transistor 16 is switched off and whilst the transistor current is rising. By arranging for the time constant of the inductor 14 and the diode 24 to be large compared to the operating frequency of the d.c. converter the minimum level of the current in the inductor 14 can be maintained to a value just below the saturation current of transformer 10 and the losses in the diode and inductor are kept to a minimum.

Referring now to FIG. 2, the timing of the various phases of the operation of the circuit is made clear therein. The current in the inductor 14 (FIG. 2b) rises and falls in a triangular manner, with the curent reaching a maximum at about 5 amps, which is the same as the peak current in the collector of transistor 16. It will be noted that the collector current (FIG. 2a) rises relatively steeply at swtich-on until it becomes the same as the inductor current whereafter the collector current rises more slowly as a result of the increased inductive load. The voltage across the inductor 14 (FIG. 2c) is relatively low until the inductor current starts to increase and a "false peak" occurs as the transformer core goes into saturation. The waveforms shown in FIGS. 2d and 2e are self explanatory.

It should be noted that the air gap in the transformer core is not sufficient to prevent this saturating at the appropriate primary current level, but has the effect of reducing the remanence as compared with a core with no air gap. The hysteresis curve of a gapless core of mumetal is substantially rectangular so that the remanance is substantially the same as the saturation level. With an air gap, the hysteresis curve is a narrow parallelogram. With such an arrangement no provision needs to be made to reset the transformer core after it goes into saturation.

The energy stored in the transforemr per cycle is now not dependent on the d.c. gain of the transistor 16 since switching is achieved by saturation of the transformer core which is less temperature dependent than the d.c. gain of the transistor. Hence the output power per cycle is relatively invariable with temperature.

To illustrate the advantage to be gained by the invention it is observed that a conventional oscillator in which switching is determined by the transistor characteristics but which is otherwise comparable to that described herein will produce approximately 150 sparks per minute at −55° C. with a supply voltage of 29 V and only 30 sparks per minute at 125° C. at a supply voltage of 16 V. The example described on the other hand, produces between 50 and 90 sparks per minute over the same voltage and temperature range.

We claim:

1. A spark ignition system comprising a d.c. to d.c. converter including a transformer having a primary winding, a secondary winding and a feedback winding, a core by which said windings are linked said core having an air gap and being arranged to saturate when the primary current exceeds a predetermined level, a transistor connected to control the current in the primary winding of the transformer, the feedback winding being connected to the base of the transistor to provide positive feedback thereto, an inductor connected in series with the primary winding of the transformer and having an inductance significantly greater than the inductance of the primary winding when the transformer core is saturated but significantly less than the inductance of the primary winding when the transformer core is not saturated, the inductor being designed so as to be unsaturable by said predetermined current level, a diode connected across the inductor so as to maintain current flow therein when the transistor is off and means connected to the secondary winding for periodically producing sparks.

2. A spark ignition system as claimed in claim 1 in which the collector of the transistor is connected via the primary winding and the inductor in series to a first supply terminal, the emitter of the transistor is connected to a second supply terminal and the base of the transistor is connected to the feedback winding to a point on a bias circuit connected between the supply terminals.

3. A spark ignition system as claimed in claim 1 in which the core of the transformer has an air gap so that its hysteresis curve is a narrow parallelogram and the remanence of the core is small compared with the saturation level thereof.

4. A spark ignition system as claimed in claim 1 in which the spark producing means comprises a capacitor connected across the secondary winding in series with a rectifier diode, and a spark gap and a spark discharge plug in series across the capacitor.

* * * * *

UNITED STATES PATENT AND TRADEMARK OFFICE
CERTIFICATE OF CORRECTION

PATENT NO. : 4,261,025
DATED : April 7, 1981
INVENTOR(S) : Henry James Chafer & Anthony John Purkiss It is certified that error appears in the above—identified patent and that said Letters Patent is hereby corrected as shown below:

At Column 3, line 14, "curent" should be --current--;
At Column 3, line 18, "swtich-on" should be --switch-on--;

At Column 3, line 37, "transforemr" should be --transformer--.

Signed and Sealed this

Ninth Day of March 1982

[SEAL]

*Attest:*

*Attesting Officer*

GERALD J. MOSSINGHOFF

*Commissioner of Patents and Trademarks*